M. WORKSMAN.
MOTOR CAR.
APPLICATION FILED JULY 17, 1915. RENEWED DEC. 7, 1918.

1,308,316.

Patented July 1, 1919.
3 SHEETS—SHEET 2.

Inventor
Morris Worksman

By his Attorneys

M. WORKSMAN.
MOTOR CAR.
APPLICATION FILED JULY 17, 1915. RENEWED DEC. 7, 1918.
1,308,316.
Patented July 1, 1919.
3 SHEETS—SHEET 3.
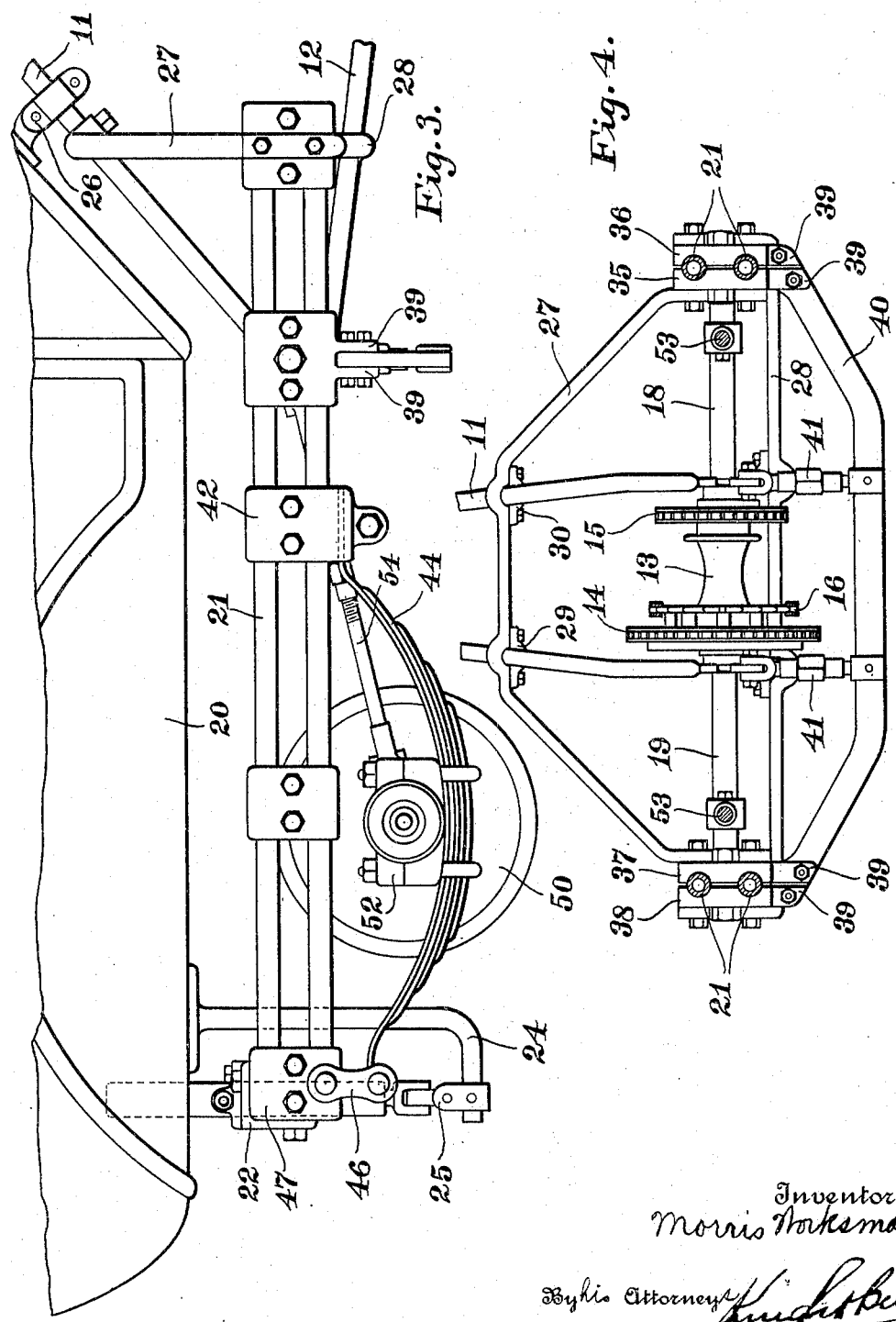

UNITED STATES PATENT OFFICE.

MORRIS WORKSMAN, OF NEW YORK, N. Y.

MOTOR-CAR.

1,308,316.   Specification of Letters Patent.   Patented July 1, 1919.

Application filed July 17, 1915, Serial No. 40,413. Renewed December 7, 1918. Serial No. 265,790.

*To all whom it may concern:*

Be it known that I, MORRIS WORKSMAN, a citizen of the United States, residing in the borough of Manhattan, city, county, and State of New York, have invented certain new and useful Improvements in Motor-Cars, of which the following is a specification.

My invention relates in general to motor cars, and especially to that type of motor cars comprising a detachable car body and frame for motor cycles. Side cars, for motor cycles have been employed to some extent, but they are subject to objectionable strains.

My invention relates particularly to a trailer car attachment for motor cycles.

The invention is illustrated in the accompanying drawings, in which—

Fig. 3 is a side elevation thereof with a portion of the car body in place, and

Fig. 4 is a transverse vertical section, taken on the line 4—4 of Fig. 2.

Figure 1:
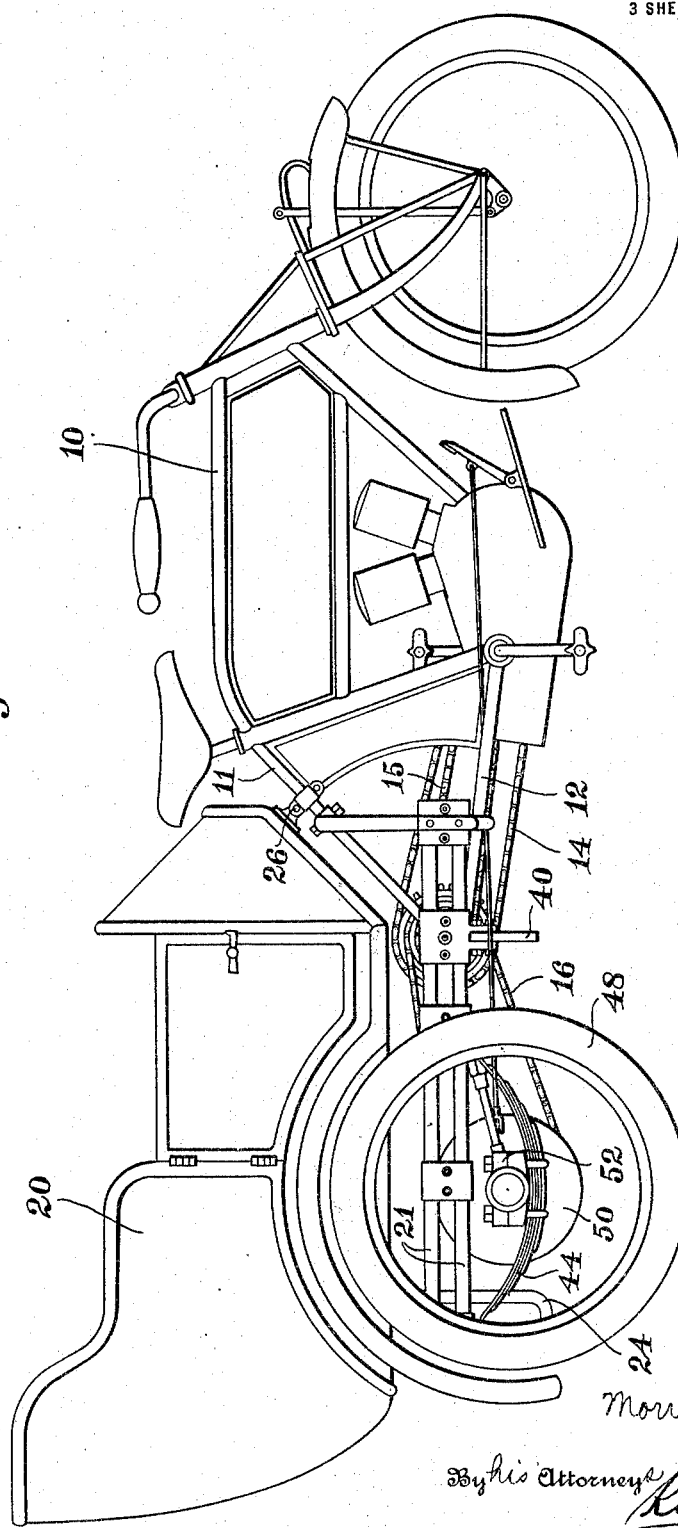
Figure 1 is a side elevation of the assembled device.

Referring in detail to said drawings, 10 indicates in general a motor cycle having a rear frame 11, 12, from which the rear wheel and axle is removed. The rear wheel axle is substituted by a hub 13, bearing the two chain drives 14, 15, for applying power to the hub and the chain drive 16, for transmitting power from the hub to the trailer body attachment to be described. The hub 13 is mounted on an axle 17, which has extension pieces 18, 19, screwed thereon against the faces of the rear frame, as illustrated clearly in Figs. 2 and 4.

The car body is indicated at 20 and is mounted upon a frame which comprises in general the double side bars 21 and rear cross bar 22. The rear cross bar 22 is provided with shock absorbers 23, to which the car body is secured through the posts 24 and clevis 25 (see Fig. 3). The forward portion of the car body is pivoted to the rear frame 11 at the clamp 26 (Figs. 1 and 3). This arrangement provides for relative motion between the car body 20 and the frame. The car body frame is secured to the rear frame of the motor cycle by means of bars or rods 27, 28, the rod 27 being clamped firmly against the rear frame 11 of the motor cycle by the plates 29, 30, whereas the bar 28 merely rests against the bottom of the rear frame portion 12 of the motor cycle. Bar 27 is secured to the inner face of side bar clamps 31, 32, while bar 28 is secured to the outer face of side bar clamps 33, 34.

Figure 2:
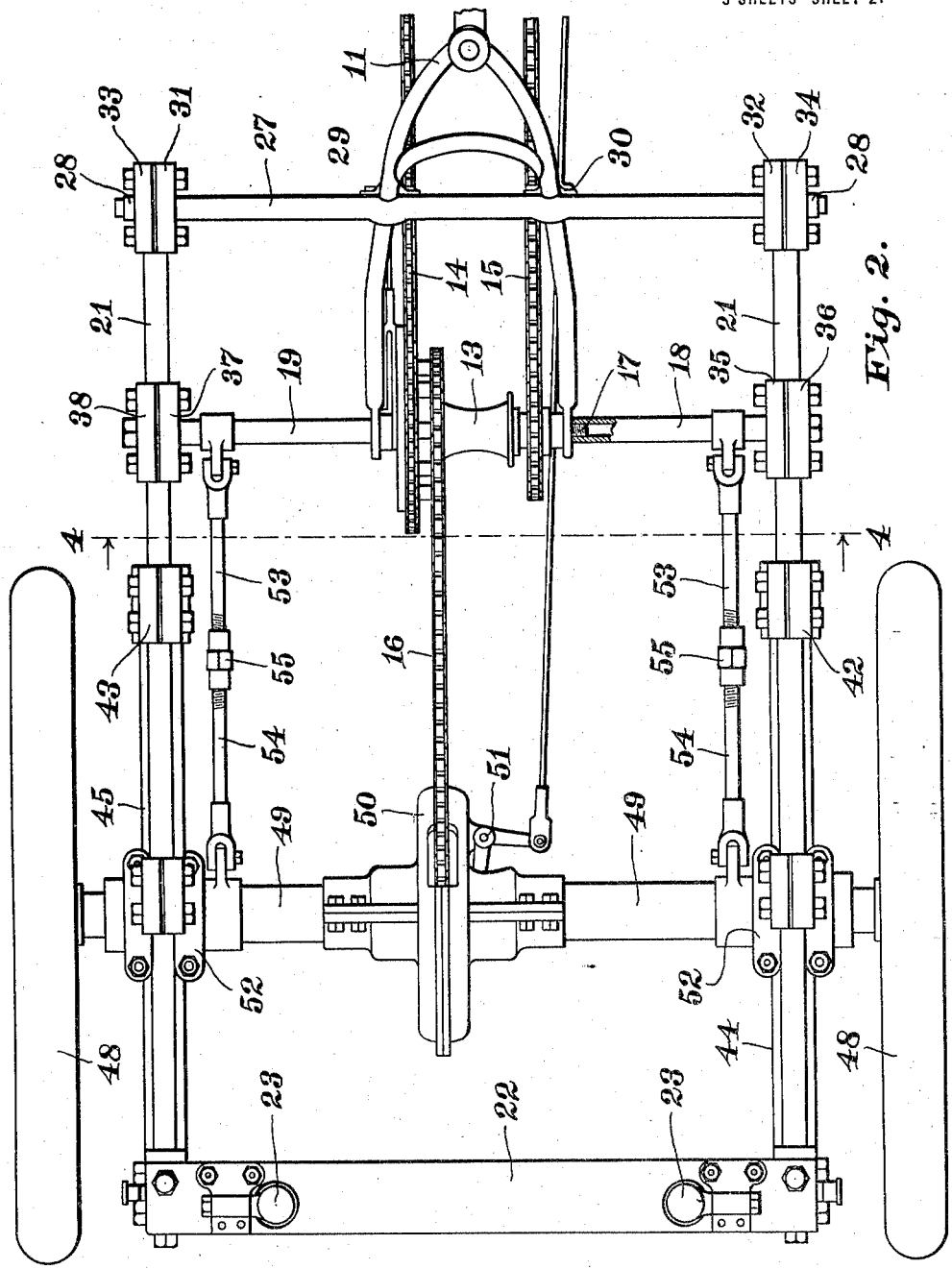
Fig. 2 is a top plan view of the car body frame, with the body removed.

In order to stiffen and reinforce the frame where the driving strain occurs, namely, at the point of connection with the chain and sprocket drive 16, I provide a truss frame extending across the car body frame proper. Referring to Figs. 2, 3 and 4, it will be seen that the axle extensions 18, 19 are mounted in side bar clamps 35, 36 and 37, 38. These clamps are bolted together against the double side bars 21 and have depending ears 39 within which is bolted the truss bar 40, which extends across the frame. The truss bar 40 is connected at intermediate points with the rear frame of the motor cycle by means of the turn buckles 41, as shown clearly in Fig. 4.

Immediately behind the side bar clamps 35, 36, 37 and 38 are located the similar clamps 42, 43, in which are slidably mounted the forward ends of leaf springs 44, 45. The rear end of each of the leaf springs 44, 45 is mounted in a shackle 46, which is secured to the rearmost side bar clamp 47, on which is mounted the rear cross bar 22 of the car body frame. A pair of wheels 48 are suitably mounted on shafts 49 and properly connected with the drive and clutch mechanism 50, 51. The axles are journaled in bearing blocks 52, which are clamped to the leaf springs 44, 45. The bearing blocks 52 are coupled with the axle extensions 18, 19 of the driving mechanism by means of tie rods 53, 54, which have turn buckles 55 for adjusting the location of axles 49, with respect to axle extensions 18, 19. The construction thus permits the frame itself to play upon the springs 44, 45, while the car body plays upon the frame, and at the same time the tension upon the driving chains is susceptible of adjustment.

I claim:

1. A trailer car attachment for motor cycles comprising in combination a car body, a frame, means for yieldingly connecting said car body with said frame, a pair of wheels, means for yieldingly connecting said frame with said wheels and means for firmly securing said frame to the rear frame of a motor cycle.

2. The combination with a motor cycle having its rear wheel removed and provided with a chain drive, of a trailer car body and frame having wheels operatively connected with the chain drive of said motor cycle, means securely fixing said car body frame to the rear frame of the motor cycle and maintaining said motor cycle frame in a substantially vertical plane, and means for adjusting the distance between the driving mechanism of the motor cycle and the driving connection of the car body.

3. The combination with a motor cycle having its rear wheel removed and provided with a chain drive, of a trailer car body and frame having wheels operatively connected with the chain drive of said motor cycle, means securely fixing said car body frame to the rear frame of the motor cycle and maintaining said motor cycle frame in a substantially vertical plane, and means for trussing and reinforcing the frame adjacent to the driving mechanism of the motor cycle.

MORRIS WORKSMAN.

Copies of this patent may be obtained for five cents each, by addressing the "Commissioner of Patents Washington, D. C."